Patented July 29, 1924.

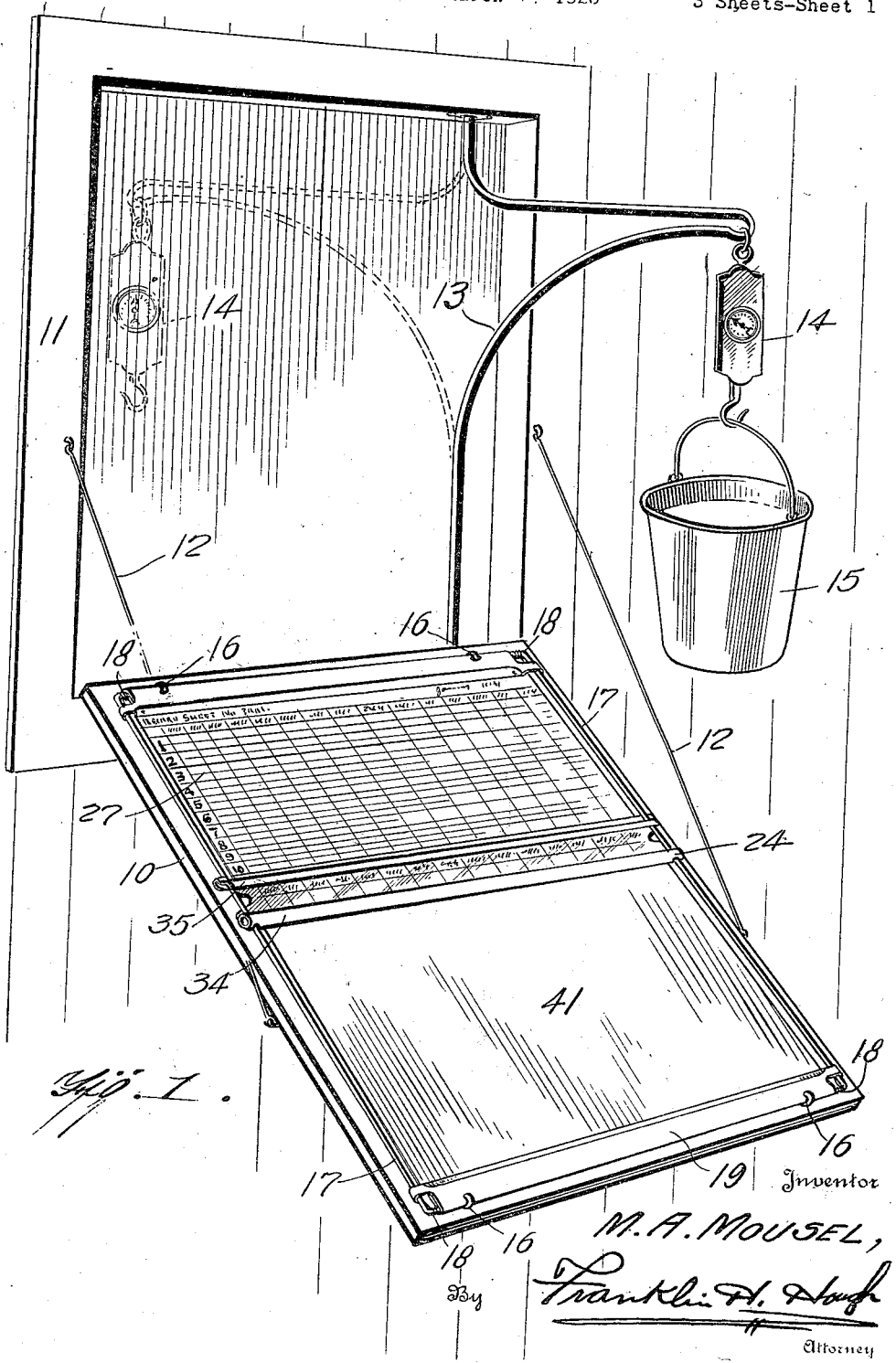

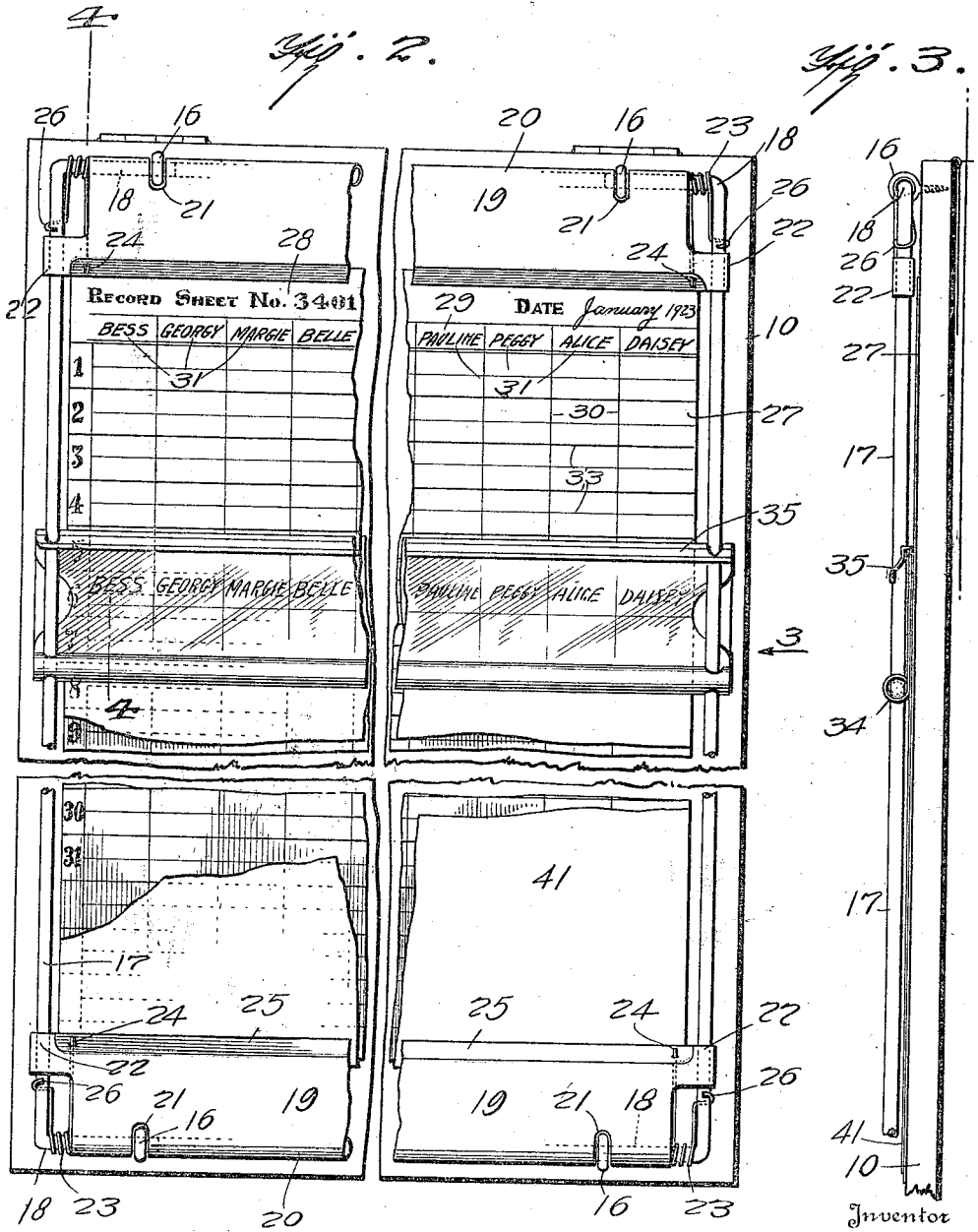

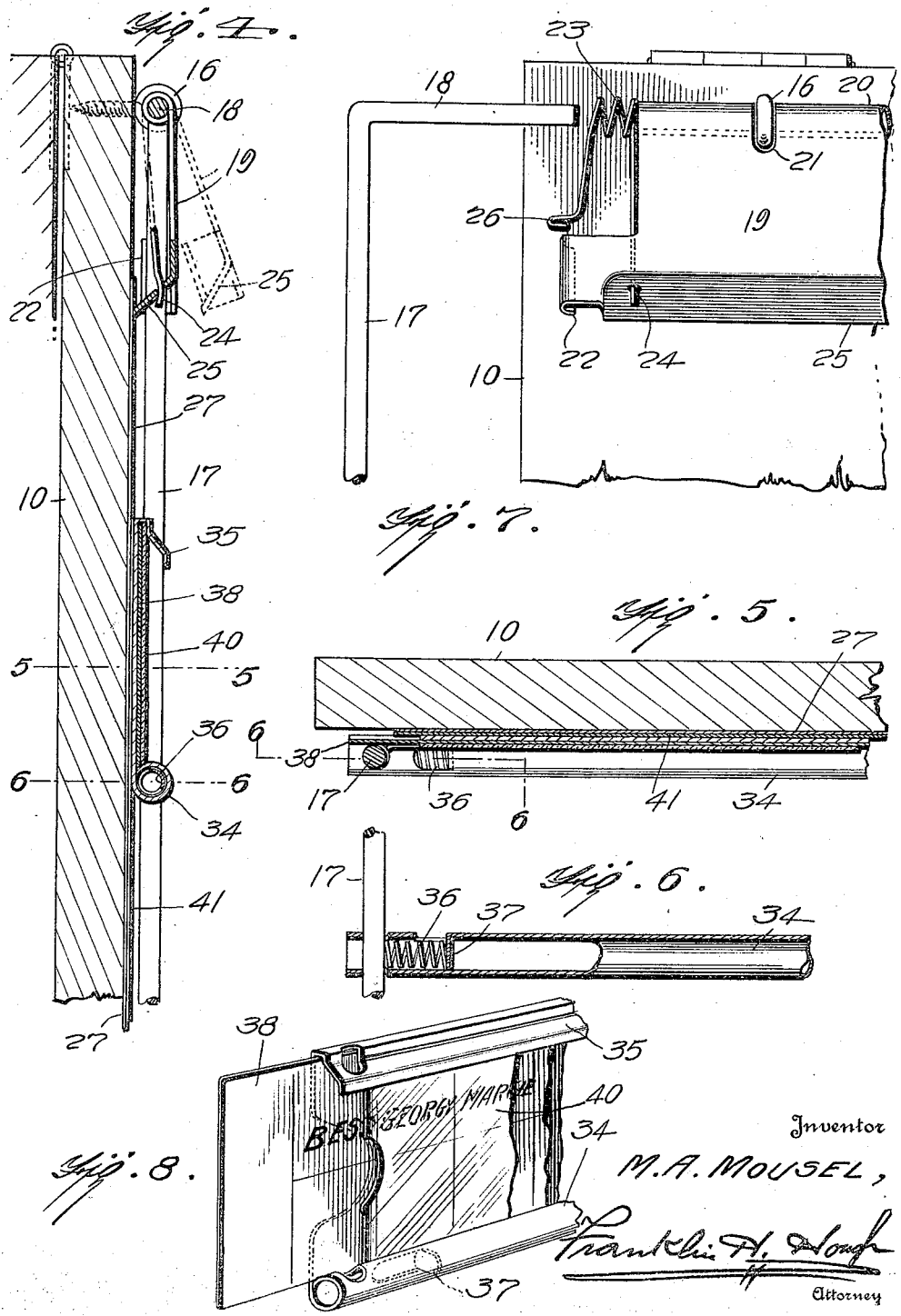

1,503,330

UNITED STATES PATENT OFFICE.

MIKE A. MOUSEL, OF ELMWOOD, WISCONSIN.

RECORD CABINET.

Application filed March 7, 1923. Serial No. 623,522.

*To all whom it may concern:*

Be it known that I, MIKE A. MOUSEL, a citizen of the United States, residing at Elmwood, in the county of Pierce and State of Wisconsin, have invented certain new and useful Improvements in Record Cabinets; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to record cabinets and has for an object to provide an apparatus especially designed and adapted for recording milk production at the time of such production and for each of the cows separately and individually for the time period.

A further object of the invention is to provide a record cabinet embodying a closure or door serving when open as a desk and when closed for enclosing a scale which is employed in weighing the milk produced, with improved means upon the desk for retaining a record sheet and enabling the operator to use the same intelligently.

A further object of the invention is to provide a folding desk apparatus having rods extending along its longitudinal edges upon which said rods as guides a chart is movable over and upon the record sheet, the ruling of the chart and the record sheet corresponding.

A further object of the invention is to provide upon a desk guide rods with improved means co-acting with said guide rods for clamping a ruled record sheet beneath such rods and upon the desk surface, with a chart slidable upon rods and upon or adjacent to the surface of the record sheet carrying designations corresponding to columns upon the record sheet similarly designated.

A further object of the invention is to provide an improved form of chart slidable upon guide rods.

A further object of the invention is to provide improved means for attaching the guide rods to the desk top to co-act with the chart and record sheet.

With these and other objects in view the invention comprises certain novel parts, units, elements, combinations, constructions, arrangements, functions and inter-actions, as disclosed in the drawings, together with mechanical and functional equivalents thereof, as will be hereinafter more fully described and claimed.

In the drawings:

Figure 1 is a perspective view of the cabinet open with the scale swung outwardly to milk-weighing position, and the desk shown open;

Figure 2 is a top plan view of the record sheet and co-acting parts broken to indicate indefiniteness of size in both directions;

Figure 3 is a view of the device in edge elevation, as indicated by arrow 3 at Figure 2;

Figure 4 is a longitudinal sectional view taken on line 4—4 of Figure 2;

Figure 5 is a transverse sectional view taken on line 5—5 of Figure 4;

Figure 6 is a transverse sectional view taken on line 6—6 of Figure 4;

Figure 7 is a detail fragmentary view of the manner of attaching the guide rods to the desk top and the clips to the guide rods;

Figure 8 is a detail fragmentary perspective view of one end of the chart showing the manner of removing and replacing the chart strip.

Like characters of reference indicate corresponding parts throughout the views.

The present invention is directed more particularly to the arrangement co-acting with the record sheet, which is here shown and will preferably be used by placing the record sheet upon a closure 10 forming the door of a cabinet 11 when closed. As shown at Figure 1, the desk is open and is supported by brace rods 12 to form a desk, and shows a crane 13 pivoted within said cabinet, from which is suspended a scale 14, which is a conventional spring balance type, although the type of scale forms no part of the present invention, the scale being employed for weighing the contents of a container 15 intended as a milk receptacle.

Upon the desk 10 and in proper spaced positions are a plurality of eyes 16 preferably of the usual and well-known screw-eye type, the shanks of which are screwed directly into the material of the desk top, as indicated more particularly at Figures 3 and 4.

Engaged by the screw-eyes 16 is a pair of parallel guide-rods 17 having their ends turned at right angles, as indicated at 18, to slip into said screw eyes.

The rods are properly spaced relative to each other by substantially identical clips 19 at opposite ends. These clips 19 have one edge rolled, as indicated at 20, the roll being of such proportion as to receive and freely fit the right-angularly turned ends 18. The rolls are provided with cut-outs or notches 21 properly positioned to accommodate the eyes 16 so that when the clips 19 are in position with the eyes 16 located in the notches 21, the ends 18 of the guides may be slidably inserted into the ends of the rolls 20 and through the eyes 16. To maintain the proper positioning of the clips 19 upon the guide-rods 17, said clips are provided with hooked ears 22, proportioned to engage over the rods 17, as shown more particularly at Figures 2 and 3. Upon the ends 18 a coil spring 23 is employed tending to hold the rods 17 spaced apart and, therefore, into proper engagement with the hooks 22. One end of the coil spring 23 is inserted, as indicated at 24, through the downturned clamping edge 25 of the clip, the other end of the spring being provided with a hook 26 hooking under the rod 17, the tension of the spring being such as will tend to hold the clip 19 with its clamping edge 25 downwardly with considerable force upon the surface of the desk or a sheet placed upon this desk. As shown at Figures 1 and 2, the sheet 27 is provided with a marginal heading 28 at the top, properly identifying the sheet in any approved manner, as by the number of the sheet, or the date of the period for which the sheet is employed. Beneath this marginal heading 28 a sub-heading 29 is provided divided by longitudinal or vertical rulings 30 into a plurality of columns properly headed by names 31, as for instance, the names of cows whose record is being kept upon the sheet.

Transverse rulings are provided upon this sheet properly designated at one side by numerals indicated at 32, which may indicate the days of the calendar month, such rulings 33 being provided as will properly divide the space so designated into two spaces for receiving data intended for recording morning and evening milkings.

Slidable upon the rod 17 is a chart having means for slidable engagement with said rods, as for instance the roll 34 at the lower edge of said chart and an inturned lip 35 at the upper edge. To maintain this chart slidably in adjusted position, springs 36 are inserted in the rolls 34 (see Figs. 4 and 6), bearing against the rods 17 at one end and against any conveniently-formed abutment 37, at their opposite ends which may and preferably will be formed by striking in a part of the material of the roll.

This chart member thus formed is adapted to carry a chart strip 38 upon which appear names 39 corresponding to and spaced similarly to the names appearing in the space 31 at the top of the sheet 27. The names in the spaces 31 are permanently applied to the record sheet, but the names carried by the chart strip 38 are movable with the chart construction, so that each day, or twice each day, the chart organization is movable downwardly along the rods 17, but the names of the cows are always available immediately below the upper edge of this chart organization.

Preferably, also, a protecting transparent sheet 40 is employed covering the chart strip 38, but permitting the ready removal of the chart strip from under said transparent protecting member for the change of names or other data, as occasion or exigencies of use may make desirable.

It is also purposed to cover the record sheet 27 when initially installed with a protecting sheet 41 which may conveniently be of any otherwise waste paper, as for instance newspaper properly cut to size and spread over the top of the record sheet. This is merely a protective measure and as the chart organization is moved downwardly, successive strips of this protective sheet are torn along the upper edge of the chart member to expose additional lines and columns of the record sheet to view and to receive data.

In the placing of a record sheet in position, the chart organization is first moved upwardly to its limit of movement and in engagement with the upper clip 19. This provides for certain yielding of the rods 17 which are disengaged by lifting the lower clip 19 to disengage the hooks 22 therefrom, permitting the ends 18 to be forced outwardly by the springs 23 to release the eyes 16, but still retain the ends of said rods in the roll 20, by reason of the engagement of the hook 26 and extremity 24. The releasing of the ends 18 of the rods from the eyes 16 permits the entire structure to be raised upon the eyes 16 at the top of the desk as a pivot, or as hinges. The old record sheet may now be removed for any reason and a new record sheet be spread in proper position upon the desk. The device is now returned to operative position, the ends 18 of the rods 17 forced into engagement with the eyes 16 and the hooks 22 engaged over said rods, whereby the record sheet is smoothly and effectively retained by the clamping edges 25 of the spaced clips 19.

What I claim is:

1. A record cabinet embodying a desk closure, sheet clamps at the opposite ends of the closure, guide rods at opposite sides of the closure, means whereby the clamps and guide rods each hold the other in operative positions, and a chart mounted to slide upon the rods.

2. A record cabinet embodying a desk closure, sheet clamps at the opposite ends of the closure, guide rods at the opposite sides of the closure pivoting the clamps, means whereby the clamps and guide rods each hold the other in operative positions, and a chart mounted to slide upon the rods.

3. A record cabinet embodying a desk closure, sheet clamps at opposite ends of the closure, guide rods at opposite sides of the closure with right angled bends pivoting the clamps, means whereby the clamps and guide rods each hold the other in operative positions, and a chart mounted to slide upon the rods.

4. A record cabinet embodying a desk closure, eyes rigidly connected with the closure at the top and bottom, sheet clamps at the opposite ends of the closure, guide rods at opposite sides of the closure with right angled bends engaging said eyes and pivoting the clamps, means whereby the clamps and guide rods each hold the other in operative positions, and a chart mounted to slide upon the rods.

5. A record cabinet embodying a desk closure, sheet clamps at the opposite ends of the closure, guide rods at the opposite sides of the closure, means whereby the clamps and guide rods each hold the other in operative positions, a chart mounted to slide upon the rods, and means tending to open the clamps and displace the rods when the holding means is disconnected.

6. A record cabinet embodying a desk closure, sheet clamps at the opposite ends of the closure, guide rods at the opposite sides of the closure pivoting the clamps, means whereby the clamps and guide rods each hold the other in operative positions, a chart mounted to slide upon the rods, and springs tending to open the clamps and displace the rods when the holding means is disconnected.

7. A record cabinet embodying a desk closure, eyes rigidly connected with the closure at the top and bottom, sheet clamps at the opposite ends of the closure, guide rods at the opposite sides of the closure with right angled bends engaging said eyes and pivoting the clamps, means whereby the clamps and guide rods each hold the other in operative positions, a chart mounted to slide upon the rods, and means tending to open the clamps and displace the rods when the holding means is disconnected.

8. A record cabinet embodying a desk closure, sheet clamps at the opposite ends of the closure, guide rods at the opposite sides of the closure, means whereby the clamps and guide rods each hold the other in operative positions, a chart mounted to slide upon the rods, and tension means carried by the chart engaging the rods.

9. A record cabinet embodying a desk closure, eyes rigidly connected with the closure at the top and bottom, sheet clamps at the opposite ends of the closure, guide rods at the opposite sides of the closure with right angled bends engaging said eyes and pivoting the clamps, means whereby the clamps and guide rods each hold the other in operative positions, a chart mounted to slide upon the rods, and tension means carried by the chart and engaging the rods.

10. A record cabinet embodying a desk closure eyes rigidly connected with the closure at the top and bottom, sheet clamps at the opposite ends of the closure, guide rods at the opposite sides of the closure with right angled bends engaging said eyes and pivoting the clamps, means whereby the clamps and guide rods each hold the other in operative position, a chart mounted to slide upon the rods, tension means carried by the chart engaging the rods, and means tending to open the clamps and displace the rods when the holding means is disconnected.

In testimony whereof I hereunto affix my signature.

MIKE A. MOUSEL.